United States Patent [19]

Okino

[11] Patent Number: 5,734,779
[45] Date of Patent: Mar. 31, 1998

[54] IMAGE PICKUP DEVICE HAVING A PLURALITY OF PICKUP ELEMENT REGIONS AND A COLOR FILTER

[75] Inventor: Tadashi Okino, Yokohama, Japan

[73] Assignee: Canon Kabushiki Kaisha, Tokyo, Japan

[21] Appl. No.: 295,151

[22] Filed: Aug. 24, 1994

Related U.S. Application Data

[63] Continuation of Ser. No. 787,782, Nov. 4, 1991, abandoned.

[30] Foreign Application Priority Data

Nov. 5, 1990 [JP] Japan ................................ 2-297191
Nov. 5, 1990 [JP] Japan ................................ 2-297192

[51] Int. Cl.⁶ .................................. H04N 5/91; H04N 5/765
[52] U.S. Cl. ........................... 386/38; 386/31; 358/906
[58] Field of Search .............................. 358/335, 906, 358/310, 909.1; 360/35.1, 33.1; 348/224, 273, 274, 275; 386/107, 111, 1, 30, 38, 31; H04N 5/91, 5/765

[56] References Cited

U.S. PATENT DOCUMENTS

| | | | |
|---|---|---|---|
| 4,467,369 | 8/1984 | Alston | 358/332 |
| 4,608,609 | 8/1986 | Tanako et al. | 358/310 |
| 4,777,538 | 10/1988 | Ueno et al. | 358/341 |
| 4,829,368 | 5/1989 | Kobayashi et al. | 358/213.23 |
| 4,982,290 | 1/1991 | Nishi et al. | 358/310 |
| 4,985,758 | 1/1991 | Hashimoto | 358/213.26 |
| 5,016,107 | 5/1991 | Sasson et al. | 358/906 |
| 5,034,804 | 7/1991 | Sasaki et al. | 358/335 |
| 5,040,068 | 8/1991 | Parulski et al. | 358/909.1 |
| 5,170,296 | 12/1992 | Eiberger | 358/335 |
| 5,260,776 | 11/1993 | Taguchi et al. | 358/310 |

*Primary Examiner*—Thai Tran
*Assistant Examiner*—Huy Nguyen
*Attorney, Agent, or Firm*—Fitzpatrick, Cella, Harper & Scinto

[57] ABSTRACT

A recording/reproducing system is provided with an image pickup element comprising a color filter having a plurality of colors. An image pickup device compresses the color image information obtained from the image pickup element to provide compressed image information. A recording device records the compressed image information on a recording medium. A reproducing device extracts and expands the compressed image information from the recording medium. The image pickup device compresses the color image information for the respective colors of the color filter, and the reproducing device forms color video signals after expanding the color image information.

7 Claims, 4 Drawing Sheets

IMAGE PICKUP DEVICE HAVING A PLURALITY OF PICKUP ELEMENT REGIONS AND A COLOR FILTER

This application is a continuation of application Ser. No. 07/787,782 filed Nov. 4, 1991, now abandoned.

BACKGROUND OF THE INVENTION

1. Field of the Invention

This invention relates to an image pickup device, a recording device, a reproducing device and a recording/reproducing system, and more particularly to digital processing of color image signals used in a video camera or the like.

2. Description of the Prior Art

Recently, video signals containing a large quantity of information are frequently subjected to digital processing. Digitized video signals have the advantage that the picture quality does not deteriorate even if electromagnetic conversion (recording/reproducing, dubbing or the like) is repeated. However, video signals digitized without adaption contain a huge amount of data. Accordingly, in a conventional image pickup device, the video signals are subjected to signal compression to reduce redundancy, thus reducing the storage capacity and transmission time of such signals.

However, the above-described signal compression method used in the conventional image pickup device has the the following problems.

In particular, compression of video signals is usually performed for R, G and B signals or Y, R-Y and B-Y (luminance and color-difference) signals which are standard video signals. There are few problems in the compression of signals which have already been provided in the above-described forms or the conversion of a composite video signal into the above-described signals. In a video camera or the like, however, before compressing image information obtained from an image pickup element, a process of converting the obtained information into the above-described R, G and B signals or luminance and color-difference signals is required.

Particularly in a single-plate or single-tube image pickup device usually used in a video camera or the like, a color filter having the shape of stripes, a mosaic or the like are provided on the surface of an image pickup element or an image pickup tube in order to intermittently receive information relating to the R, G and B colors. Accordingly, in order to obtain the above-described standard video signals (R, G and B signals, or luminance and color-difference signals), calculation processing, such as interpolation or the like, is required to allocate the information relating to R, G and B colors to the entire picture frame. Hence, signal processing for obtaining standard video signals becomes complicated.

Also in a compression process after converting the obtained information into standard video signals, for, for example, R, G and B signals, the calculation of compression of information corresponding to the number of picture elements in the entire picture frame is needed for respective R, G and B colors, and the number of picture elements to be subjected to the calculation of compression equals three times the number of picture elements in a single image pickup element. The situation is the same in the case wherein the video signals are in the form of luminance and color-difference signals, and therefore the amount of calculation of compression is increased.

Furthermore, complicated signal processing (calculation processing) for the above-described signal compression must be performed not in a reproducing device, but in the image pickup device.

That is, in the signal compression method in the conventional image pickup device, since complicated signal processing is performed before the calculation of compression, and the amount of calculation of compression itself is great, calculation time and power consumption are increased. Hence, for an image pickup device having restricted power consumption in, for example, an outdoor photographing operation due to the small size of the device having a limited power supply, the conventional approach has the disadvantage that a great deal of time is needed for a photographing operation and therefore the number of allowable photographed frames is greatly reduced.

SUMMARY OF THE INVENTION

It is an object of the present invention to solve the above-described problems in the prior art.

It is another object of the present invention to provide an image pickup device, a recording device, a reproducing device and a recording/reproducing system which can perform digital signal processing requiring a small amount of calculation for compression processing or the like, and small power consumption.

These and other objects are accomplished, according to one aspect of the present invention, by an image pickup device provided with an image pickup element comprising a color filter having a plurality of colors to provide color information. A compression means compresses the color image information obtained from the image pickup element as monochromatic compressed image information.

According to another aspect of the present invention, an image pickup device comprises an image pickup element comprising a color filter having a plurality of colors to provide color information. A compression means directly compresses the color image information obtained from the image pickup element to provide compressed image information.

According to still another aspect of the present invention, an image pickup device comprises an image pickup element comprising a color filter having a plurality of colors to provide color information, the color filter having plural colors arranged in a predetermined configuration. A reading means is provided for reading the color information from the image pickup element to provide an output signal. A compression means performs compression processing of the output signal obtained from the image pickup element to provide compressed image information. A storage means stores configuration information representing the predetermined configuration of the color filter.

According to a further aspect of the present invention, a recording device comprising an image pickup element comprising a color filter having a plurality of colors to provide image information, the color filter having plural colors arranged in a predetermined configuration. A compression means compresses the image information obtained from the image pickup element as monochromatic image information. A recording means records configuration information representing the predetermined configuration of the color filter on a recording medium together with the compressed image information.

According to still a further aspect of the present invention, a reproducing device for reproducing an image from a recording medium comprises an image pickup element comprising a color filter having a plurality of colors to provide color image information, the color filter having plural colors arranged in a predetermined configuration. A compression means compresses the color image information obtained from the image pickup element as compressed monochromatic information. An expansion means expands the compressed monochromatic information to provide expanded image information. An image forming means is provided for forming color video signals from the expanded image information in accordance with the predetermined configuration of the color filter.

According to still yet a further aspect of the present invention, a recording/reproducing system comprises an image pickup device comprising an image pickup element including a color filter having a plurality of colors. The image pickup device compresses image information obtained from the image pickup element to provide compressed image information. The image pickup device compresses the image information as monochromatic image information. A recording device records the compressed image information on a recording medium. A reproducing device extracts and expands the compressed image information from the recording medium. The reproducing device forms color video signals after expanding the monochromatic image information.

According to an additional aspect of the present invention, an image pickup device comprises an image pickup element comprising a color filter having a plurality of colors to provide color image information. A compression means directly compresses the color image information obtained from the image pickup element for each of the respective colors of the color filter to provide compressed image information.

According to still yet an additional aspect of the present invention, an image pickup device comprises an image pickup element comprising a color filter having a plurality of colors, the color filter having plural colors arranged in a predetermined configuration to provide color image information. A reading means reads the color image information from the image pickup element. A compression means performs compression processing of the color image information read by the reading means for the respective colors of the color filter to provide compressed image data. A storage means stores configuration information representing the predetermined configuration of the color filter.

According to an additional aspect of the present invention, a recording device comprises an image pickup element comprising a color filter having a plurality of colors for providing color image information, the color filter having plural colors arranged in a predetermined configuration. A compression means compresses the color image information obtained from the image pickup element to provide compressed image information. A recording means records configuration information representing the configuration of the color filter on a recording medium together with the compressed image information.

According to a further aspect of the present invention, a reproducing device for reproducing an image from a recording medium comprises an image pickup device comprising an image pickup element including a color filter having a plurality of colors, the color filter having plural colors arranged in a predetermined configuration. The image pickup device compresses image information obtained from the image pickup element to provide compressed image information. An expansion means expands the compressed image information to provide expanded image information. An image forming means forms color video signals from the expanded image information in accordance with configuration information representing the predetermined configuration of the color filter.

According to an additional aspect of the present invention, a recording/reproducing system comprises an image pickup element comprising a color filter having a plurality of colors to provide color image information. An image pickup device compresses the color image information obtained from the image pickup element to provide compressed image information. A recording device records the compressed image information on a recording medium. A reproducing device extracts and expands the compressed image information from the recording medium. The image pickup device compresses the color image information for the respective colors of the color filter, and the reproducing device forms color video signals after expanding the color image information.

The foregoing and other objects and advantages of the present invention will become more apparent from the detailed description to follow taken in conjuction with the appended drawings.

DETAILED DESCRIPTION OF THE PREFERRED EMBODIMENTS

Preferred embodiments of the present invention will now be explained in detail with reference to the drawings.

Figure 1:
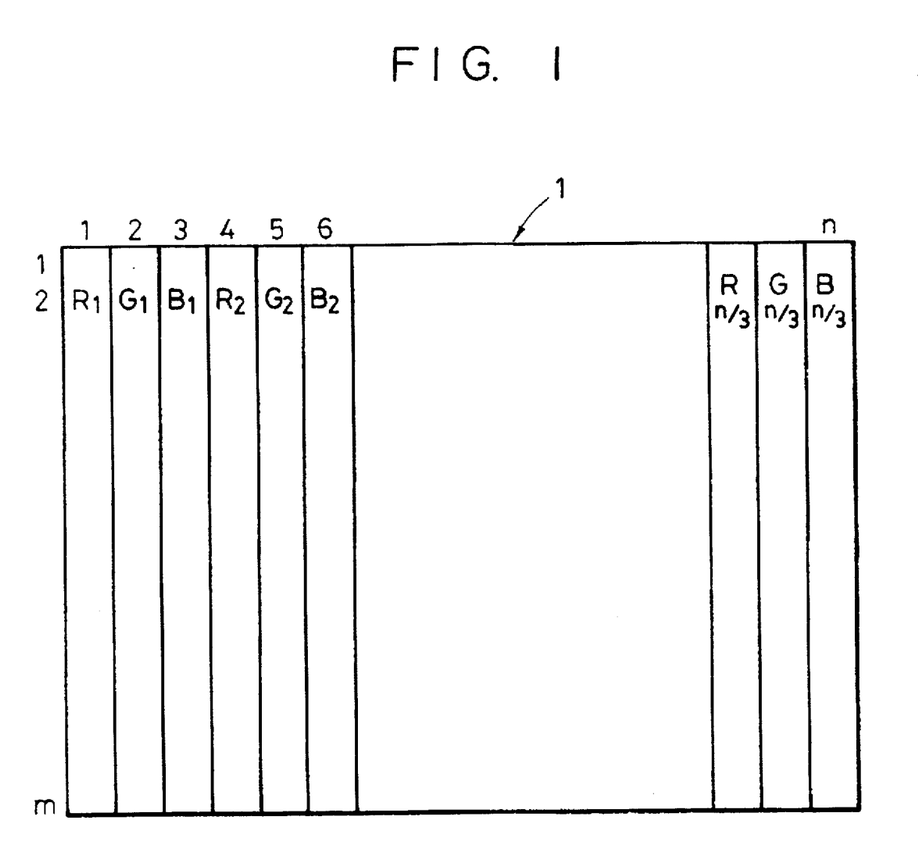
FIG. 1 is a diagram showing an example of a color filter mounted on the front surface of an image pickup element.

FIG. 1 shows an example of a color filter mounted on the front surface of an image pickup element 1. In FIG. 1, pure-colored striped filters are illustrated.

The image pickup element 1 comprises periodically-arranged (m×n) picture elements, and filters having R, G and B colors are allocated for respective rows in the vertical direction. That is, the color filter has plural colors arranged in a predetermined configuration.

Figure 2:
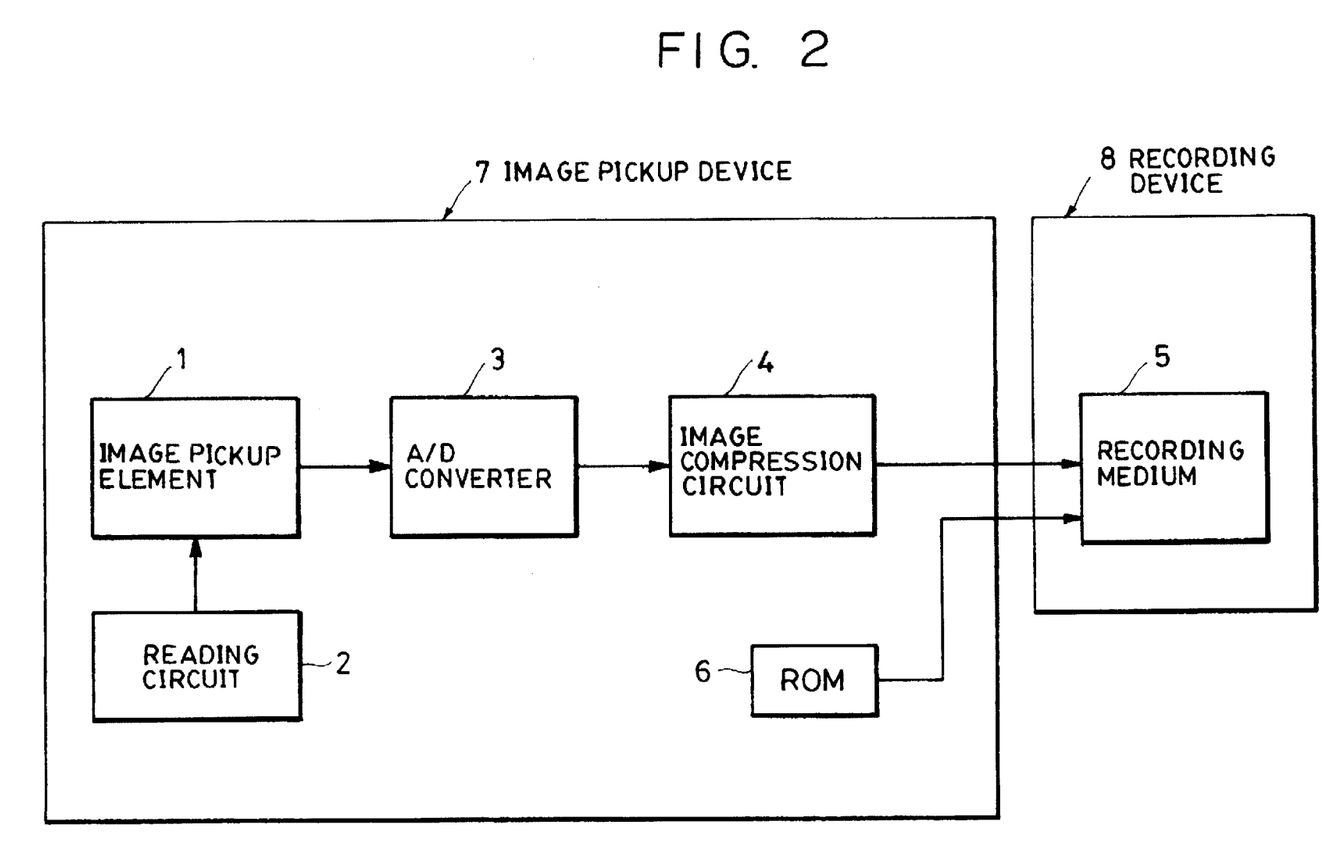
FIG. 2 is a block diagram showing the configuration of an image pickup device and a recording device according to embodiments of the present invention.

FIG. 2 is a block diagram showing the configuration of an image pickup device and a recording device according to embodiments of the present invention. In FIG. 2, an image pickup device 7 comprises an image pickup element 1, such as a CCD (charge-coupled device) or the like, a reading circuit 2 for controlling reading of electric charges from the image pickup element 1, an A/D converter 3, an image compression circuit 4, and a ROM 6 for storing, for example, coded information of the configuration of the color filter of the image pickup element 1. A recording device 8 records image information output from the image pickup device 7, configuration information of the color filter, and the like in a recording medium 5, such as a floppy disk, an IC (integrated circuit) card or the like.

An explanation will now be provided for the operation of the image pickup device and the recording device having the above-described configuration.

The image pickup element 1, to which the color filter as shown in FIG. 1 is mounted, can randomly access information of respective picture elements as an MOS (metal oxide semiconductor) device or the like does.

By the control of the reading circuit 2, electric charge signals are read in units of a picture element from the image pickup element 1. After converting the electric charge signals for each picture element into a digital value by the A/D converter 3, digital signals for one picture frame are compressed by the image compression circuit 4, and the compressed signals are recorded in the recording medium 5.

An explanation will now be provided of another embodiment of the present invention wherein the operation of the image pickup element 1 from reading to recording is improved.

Figure 3A:
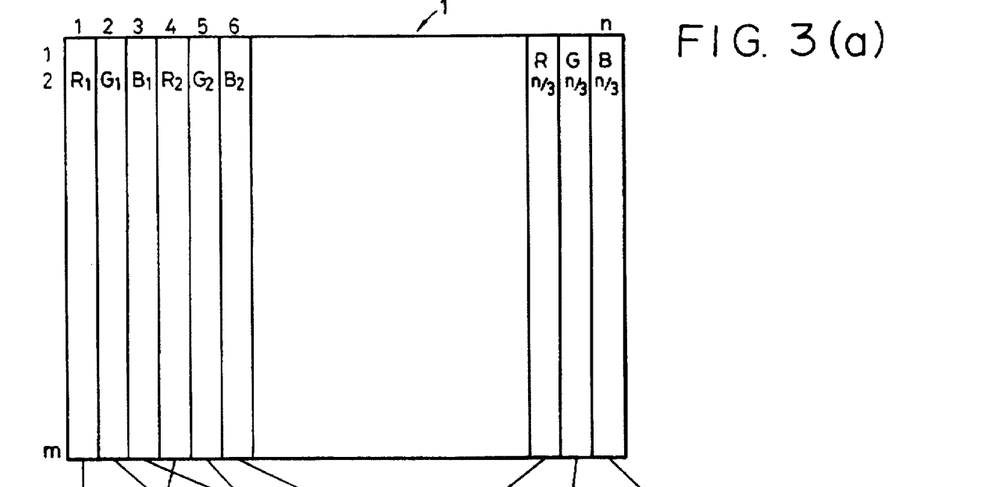
FIG. 3 is a diagram illustrating a method of reading signals from the image pickup element shown in FIG. 2 according to an embodiment of the present invention.
Figure 3B:
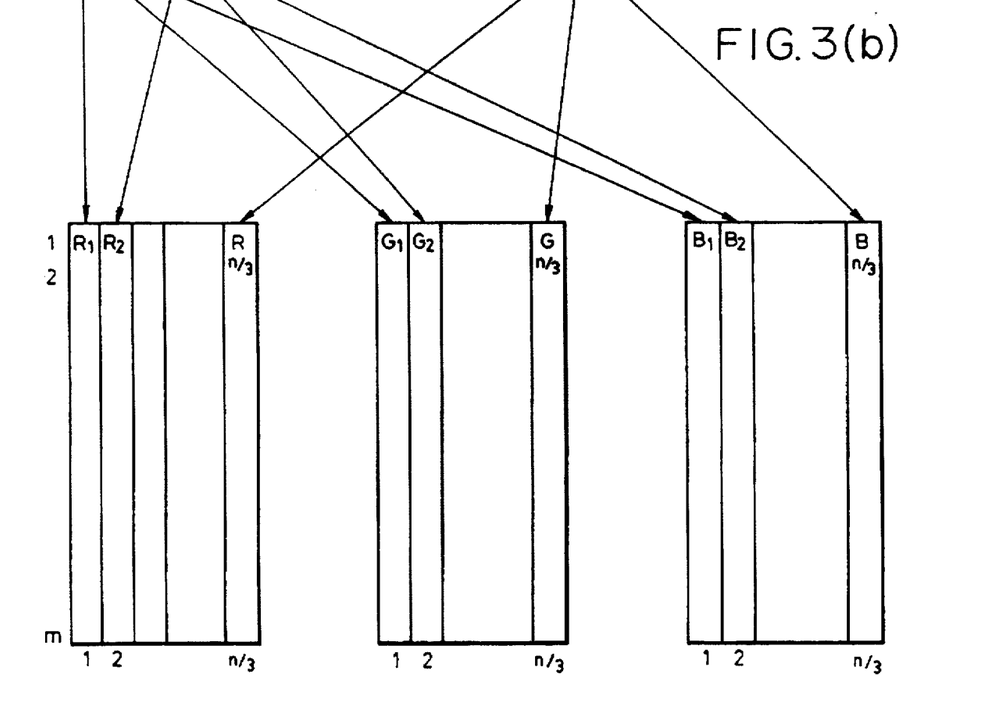

By the control of the reading circuit 2, as shown in FIG. 3(b), first only red (R) components are read from the image pickup element 1. The read signals are converted into digital signals by the A/D converter 3, the converted signals are compressed by the image compression circuit 4, and the compressed signals are recorded in the recording medium 5.

Subsequently, green (G) components are read in the same manner as for the red (R) components. The read signals are subjected to A/D conversion, and are compressed and recorded.

Further, blue (B) components are read in the same manner. The read signals are subjected to A/D conversion, and are compressed and recorded.

The above-described method of reading, A/D converting and compressing respective color components is particularly effective when portions having a particular color extend over a significant portion of a picture frame.

For example, a case wherein red portions are extensive over on a picture frame will be considered. In such a case, when signals of respective picture elements are read in the sequence of R, G and B as in a television operation from the left of the image surface shown in FIG. 3(a), a pattern wherein electric charge signals for a red (R) picture element are large, and the electric charge signals for subsequent green (G) and blue (B) picture elements are small continues, causing an abrupt change in signals of consecutive picture elements. This is not desirable in performing compression processing.

If standard video signals (R, G and B signals, or luminance and color-difference signals) are already provided when signals from the image pickup element 1 are recorded in the recording medium 5 as in the conventional signal compression method, the color information of the image signals is simultaneously recorded. In the present embodiment, however, since electric charge signals for respective picture elements are digitized without modification, and the digitized signals are compressed and recorded, only the amounts of electric charge signals for respective picture elements are recorded, but information relating to colors is not recorded. Accordingly, when reproducing the recorded signals in the reproducing device, information relating to which color each picture element belongs is needed.

Since the color filter provided in front of the image pickup element 1 generally comprises three colors and is extremely periodic, configuration information of the color filters can be represented by a simple code. Accordingly, the ROM 6 stores coded configuration information (in the present embodiment, information that R, G and B pure-color striped filter periodically arranged in the sequence of R, G and B from the left end are used, and additional information, such as the ID number of the image pickup element 1, synthetic spectral characteristics of the color filter and the image pickup element 1, calculation coefficients of matrix calculation circuitry, and the like) of the color filter of the image pickup element 1. Such information is simultaneously recorded in the recording medium 5.

Thus, compression and recording processing is terminated. Since each picture element of the image pickup element 1 has information of only one of the R, G and B colors, the number of picture elements subjected to compression calculation equals the number (m×n) of picture elements of the image pickup element 1. Hence, calculation processing can be performed with much less circuitry and time much smaller than when R, G and B signals or luminance and color-difference signals are used. Furthermore, signal processing circuitry for forming R, G and B signals or luminance and color-difference signals is not needed.

Figure 4:
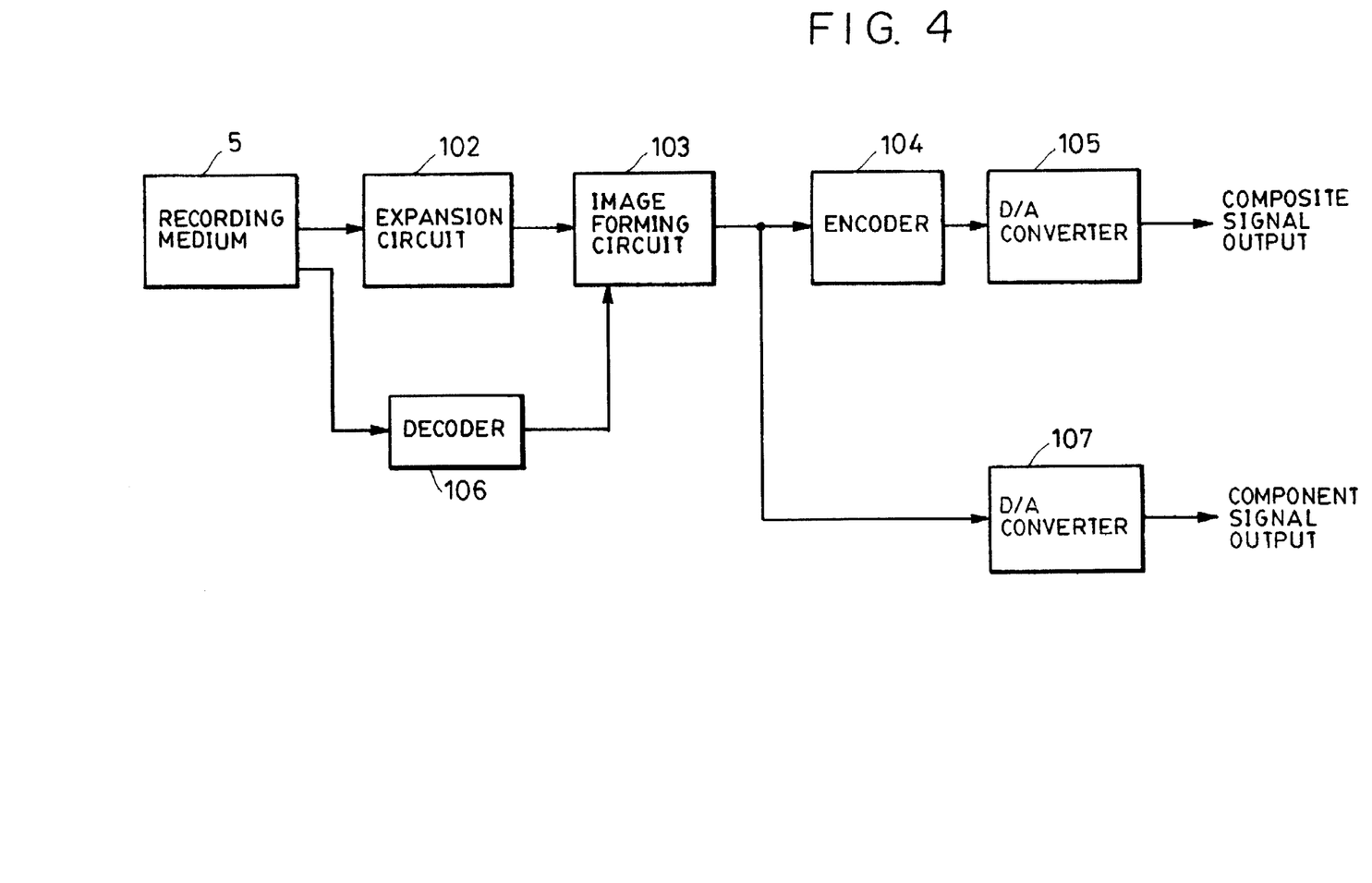
FIG. 4 is a block diagram showing the configuration of a reproducing device according to an embodiment of the present invention.

FIG. 4 is a block diagram showing the configuration of a reproducing device according to an embodiment of the present invention. In FIG. 4, reference numeral 5 indicates the same recording medium as that shown in FIG. 2. An expansion circuit 102 performs calculation inverse to the calculation by the image compression circuit 4 shown in FIG. 2. There are also shown an image forming circuit 103, an encoder 104, and D/A converters 108 and 107. A decoder 106 decodes the configuration information of the color filter of the image pickup element 1.

An explanation will now be provided of the operation of the reproducing device having the above-described configuration. First, compressed image information recorded in the recording medium 5 is converted into the original noncompressed image information by the expansion circuit 102. The information shown in FIG. 1 is thereby restored. Subsequently, the restored image information is converted into R, G and B signals or luminance and color-difference signals by the image forming circuit 103 based on color-filter information of the image pickup element 1 read from the recording medium 5 simultaneously with the image information and decoded by the decoder 106. The converted signals are then converted into an NTSC signal by the encoder 104 (all the processing is digital signal processing up to this point). The NTSC signal is converted into an analog signal by the D/A converter 105, and the converted analog signal is output as composite output signals).

If component signal output, such as R, G and B signals or luminance and color-difference signals, is desired, the output from the image forming circuit 103 may be converted into analog signals by the D/A converter 107 without performing further processing.

As explained above, by recording signals obtained by digitizing and compressing information of respective picture elements of the image pickup device as they are, or the information of respective picture elements without performing further processing when recording signals in the recording medium in the image pickup device, and by performing interpolation processing, conversion processing into color video signals, and the like of color information of respective picture elements in the reproducing device when reproducing the recorded signals, signal processing and compression calculation processing in the image pickup device are greatly reduced. It is thereby possible to reduce the scale of circuitry, power consumption and the like.

As explained above, according to the present invention, signal compression in the image pickup device is directly performed from signals obtained from respective picture elements of the image pickup element, and complicated signal processing for forming standard video signals, such as R, G and B signals or luminance and color-difference signals, interpolation calculation of color signals, and the like are performed in the reproducing device. Hence, the present invention has the effect of improving all of calculation (signal processing) time, the scale of circuitry, power consumption and the like in the image pickup device.

If signal compression in the image pickup device is directly performed from signals obtained from respective picture elements of the image pickup device for respective colors of color filter applied on the front surface of the image pickup device, signal compression processing will be further improved.

Various changes and modifications of the present invention will be made without departing from the spirit and scope of the invention.

For example, although, in the above-described embodiments, the image pickup devices the recording device and the reproducing device are separately provided, these device may be provided as one body. Alternatively, only the image pickup device and the recording device, or only the recording device and the reproducing device may of course be provided as one body.

Although an explanation has been provided illustrating pure-color striped filter as a color filter, the same effects may of course be obtained even if a complementary-color filter or a mosaic filter is used.

While the present invention has been described with respect to what are presently considered to be the preferred embodiments, it is to be understood that the invention is not limited to the disclosed embodiments. The present invention is intended to cover various modifications and equivalent arrangements included within the spirit and scope the appended claims.

What is claimed is:

1. An image pickup device comprising:
   an image pickup element comprising a plurality of pickup element regions and a color filter having a plurality of color filter regions corresponding to respective pickup element regions, each color filter region having a color, said plurality of color filter regions being arranged in a predetermined configuration;
   reading means for selectively reading image information from the plurality of pickup element regions so that the image information is divided according to each color of the plurality of color filter regions;
   compression means for compressing the divided image information read out by said reading means;
   storage means for storing configuration information representing the predetermined configuration of said color filter regions;
   outputting means for outputting the stored configuration information with the image information compressed by said compression means;
   recording means for recording the image information and the configuration information output from said outputting means on a recording medium;
   reproducing means for reproducing the image information and the configuration information recorded on said recording medium;
   expansion means for expanding the image information reproduced by said reproducing means; and
   image forming means for forming a color video signal based on the configuration information reproduced by said reproducing means and the image information expanded by said expansion means.

2. An image pickup device comprising:
   an image pickup element comprising a plurality of pickup element regions and a color filter having a plurality of color filter regions corresponding to respective pickup element regions, each color filter region having a color, said plurality of color filter regions arranged in a predetermined configuration;
   reading means for reading image information from the plurality of pickup element regions;
   compression means for dividing the read image information according to each color of said color filter and compressing the divided image information read out by said reading means;
   storage means for storing configuration information representing the predetermined configuration of said color filter regions;
   outputting means for outputting the stored configuration information with the image information compressed by said compression means;
   recording means for recording the image information and the configuration information output from said outputting means on a recording medium;
   reproducing means for reproducing image information and the configuration information recorded on said recording medium;
   expansion means for expanding the image information reproduced by said reproducing means; and
   image forming means for forming a color video signal based on the configuration information reproduced by said reproducing means and the image information expanded by said expansion means.

3. A recording/reproducing system comprising:
   an image pickup element comprising a color filter having a plurality of color filter regions, said plurality of color filter regions being arranged in a predetermined configuration;
   reading means for selectively reading image information from the plurality of color filter regions on said image pickup element;
   compression means for compressing the selectively-read image information to provide compressed image information;
   recording means for recording the compressed image information on a recording medium;
   storage means for storing configuration information representing the predetermined configuration of said plurality of color filter regions; and
   reproducing means for expanding the compressed image information from the recording medium, and for forming a color video signal from the expanded image information in accordance with the configuration information stored by said storage means.

4. A reproducing apparatus for reproducing image information from a common recording medium on which compressed coded image information and coded configuration information of said image information are recorded, the compressed coded image information being information obtained from an image pickup element having a color filter, and the coded configuration information being information representing a structure of said color filter used for color reconstructing the image information, comprising:
   reading means for reading the compressed coded image information and the coded configuration information from said common recording medium;

decoding means for decoding the coded configuration information read out by said reading means; and reproducing means for expanding and reproducing the compressed coded image information read out by said reading means based on the configuration information decoded by said decoding means.

5. A recording apparatus comprising:

inputting means for inputting image information from an image pickup element comprised by a plurality of pickup element regions and a color filter having a plurality of color filter regions arranged in a color filter configuration, each color filter region corresponding to respective pickup element regions and having a color;

compression means for producing divided image information by dividing the image information based on the color filter regions in the color filter, and for producing compressed image information by compressing the divided image information;

generating means for generating configuration information representing the color filter configuration; and recording means for recording the configuration information generated by said generating means and the compressed image information compressed by said compression means onto a recording medium, the configuration information being usable by an image reproducing apparatus to reconstruct image information from the image pickup element based on image information which has been produced from the compressed image information.

6. A recording apparatus according to claim 5, further comprising:

reproducing means for reproducing the image information and the configuration information recorded on said recording medium;

expansion means for expanding the image information reproduced by said reproducing means; and image forming means for forming a color video signal based on the configuration information reproduced by said reproducing means and the image information expanded by said expansion means.

7. A recording apparatus according to claim 5, wherein said recording means records the configuration information and the compressed image information onto a common recording medium.

* * * * *

UNITED STATES PATENT AND TRADEMARK OFFICE
CERTIFICATE OF CORRECTION

PATENT NO. : 5,734,779

DATED : March 31, 1998

INVENTOR : Tadashi Okino

It is certified that error appears in the above-identified patent and that said Letters Patent is hereby corrected as shown below:

On the title page: Item [56] Reference Cited:

"4,777,538   10/1988" should read --4,777,537   10/1988--.

COLUMN 1

Line 45, "are" should read --is--.

COLUMN 6

Line 26, "108" should read --105--.

COLUMN 7

Line 19, "devices" should read --device,--.

Signed and Sealed this

Eighteenth Day of August, 1998

Attest:

BRUCE LEHMAN

Attesting Officer

Commissioner of Patents and Trademarks